(12) United States Patent
Chai et al.

(10) Patent No.: US 9,766,502 B2
(45) Date of Patent: Sep. 19, 2017

(54) METHOD FOR FABRICATING A PHOTOLYTIC ALIGNMENT FILM COMPRISING THE STEP OF RINSING A SUBSTRATE USING A CLEANING AGENT TO REMOVE AT LEAST A NON-POLYMER DECOMPOSITION PRODUCT, LIQUID CRYSTAL DISPLAY PANEL AND DISPLAY DEVICE

(71) Applicants: SHANGHAI TIANMA MICRO-ELECTRONICS CO., LTD, Shanghai (CN); TIANMA MICRO-ELECTRONICS CO., LTD., Shenzhen (CN)

(72) Inventors: Huiping Chai, Shanghai (CN); Yong Yuan, Shanghai (CN); Chen Liu, Shanghai (CN); Wenze Shan, Shanghai (CN)

(73) Assignees: SHANGHAI TIANMA MICRO-ELECTRONICS CO., LTD, Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 345 days.

(21) Appl. No.: 14/480,597

(22) Filed: Sep. 8, 2014

(65) Prior Publication Data
US 2015/0378218 A1    Dec. 31, 2015

(30) Foreign Application Priority Data

Jun. 27, 2014    (CN) .......................... 2014 1 0304525

(51) Int. Cl.
*G02F 1/1337*    (2006.01)
*G02F 1/13*    (2006.01)

(52) U.S. Cl.
CPC .................. *G02F 1/133788* (2013.01); *G02F 2001/1316* (2013.01)

(58) Field of Classification Search
CPC .................. G02F 1/133788; G02F 2001/1316
See application file for complete search history.

(56) References Cited

U.S. PATENT DOCUMENTS

2004/0041969 A1*  3/2004  Tahon ............... G02F 1/133711
                                                              349/123
2004/0043162 A1*  3/2004  Tahon ............... G02F 1/133711
                                                              428/1.2
(Continued)

FOREIGN PATENT DOCUMENTS

CN        1228543 A       9/1999
CN      102981314 A       3/2013
(Continued)

OTHER PUBLICATIONS

Office Action for CN Appln. No. 201410304525.4 dated Mar. 30, 2016, 8 pages.

*Primary Examiner* — Paul Lee
(74) *Attorney, Agent, or Firm* — Kilpatrick Townsend & Stockton LLP

(57) ABSTRACT

The present invention relates to the field of optical alignment, which provides a method for fabricating a photolytic alignment film, a liquid crystal display panel and a display device. The method for fabricating a photolytic alignment film includes: step a: irradiating a substrate coated with a photolytic alignment material by polarized ultraviolet rays to decompose the photolytic alignment material into decomposition products, wherein the decomposition products including at least one non-polymer; and step b: rinsing the substrate irradiated by polarized ultraviolet rays by using a cleaning agent to remove the non-polymer so as to form a photolytic alignment film. In the technical solution of the (Continued)

present invention, the photolytic alignment film can be fabricated at a greatly lowered cost because the non-polymer is rinsed by using a cleaning agent.

14 Claims, 4 Drawing Sheets

(56) References Cited

U.S. PATENT DOCUMENTS

| | | | |
|---|---|---|---|
| 2006/0280881 A1* | 12/2006 | Park | G02F 1/133711 |
| | | | 428/1.26 |
| 2008/0032038 A1* | 2/2008 | Hiruma | G02F 1/1303 |
| | | | 427/58 |
| 2009/0325453 A1* | 12/2009 | Lee | C09K 19/36 |
| | | | 445/58 |
| 2010/0197186 A1 | 8/2010 | Shin et al. | |
| 2011/0199565 A1 | 8/2011 | Kunimatsu et al. | |
| 2012/0135661 A1* | 5/2012 | Imanishi | G02F 1/133723 |
| | | | 445/24 |
| 2013/0163399 A1* | 6/2013 | Shiono | B05D 5/00 |
| | | | 369/112.02 |
| 2013/0334511 A1* | 12/2013 | Savas | H01L 51/56 |
| | | | 257/40 |

FOREIGN PATENT DOCUMENTS

| | | |
|---|---|---|
| CN | 103091903 A | 5/2013 |
| CN | 103261956 A | 8/2013 |
| JP | 2005-002346 A | 1/2005 |
| JP | 2006072566 A | 3/2006 |

\* cited by examiner

METHOD FOR FABRICATING A PHOTOLYTIC ALIGNMENT FILM COMPRISING THE STEP OF RINSING A SUBSTRATE USING A CLEANING AGENT TO REMOVE AT LEAST A NON-POLYMER DECOMPOSITION PRODUCT, LIQUID CRYSTAL DISPLAY PANEL AND DISPLAY DEVICE

CROSS-REFERENCES TO RELATED APPLICATIONS

This application claims priority to Chinese patent application No. 201410304525.4, entitled "METHOD FOR FABRICATING PHOTOLYTIC ALIGNMENT FILM, LIQUID CRYSTAL DISPLAY PANEL AND DISPLAY DEVICE", filed with the State Intellectual Property Office of People's Republic of China on Jun. 27, 2014, the entire contents of which are incorporated herein by reference.

BACKGROUND OF THE INVENTION

The present invention relates to optical displays.

Over the past few decades, digital display systems have become ubiquitous. For example, LCD displays are used in televisions, computer monitors, cellular phones, tablet computers, and other types of devices. There are many display manufacturers, and they compete with one another to provide low-cost and high quality display units. Digital displays have many parts, and to improve the quality of displays, one or more display components may be improved upon to achieve that goal.

Over the past, there have been different types of conventional digital displays and improvements thereof Unfortunately, they have been in adequate, for the reasons below, and it is desirable to have new and improved display systems.

BRIEF SUMMARY OF THE INVENTION

The embodiments of the present invention are embodied in the following technical solutions:

Firstly an embodiment of the present invention provides a method for fabricating a photolytic alignment film, which comprising:

Step a: irradiating a substrate coated with a photolytic alignment material by polarized ultraviolet rays to decompose the photolytic alignment material into decomposition products including at least one non-polymer; and Step b: rinsing the substrate irradiated by polarized ultraviolet rays by using a cleaning agent to remove the non-polymer so as to form a photolytic alignment film.

An embodiment of the present invention further provides a liquid crystal display panel including a first substrate, a second substrate and a liquid crystal layer located between the first substrate and the second substrate, wherein an alignment film fabricated by using the method for fabricating a photolytic alignment film described above is provided on the side surface of the first substrate and/or the second substrate facing the liquid crystal layer.

An embodiment of the present invention further provides a display device including a backlight module and the liquid crystal display panel described above, wherein the liquid crystal display panel is located on a light-emitting side of the backlight module. There are other embodiments as well.

BRIEF DESCRIPTION OF THE DRAWINGS

In order to make the technical solutions in the embodiments of the present invention more apparent, the drawings to be used in a description of the embodiments will be briefly introduced below, and apparently the drawings to be described below are merely illustrative of some of the embodiments of the present invention, and those ordinarily skilled in the art can derive from these drawings other drawings without any inventive effort. In the drawings.

DETAILED DESCRIPTION OF THE INVENTION

Figure 1:
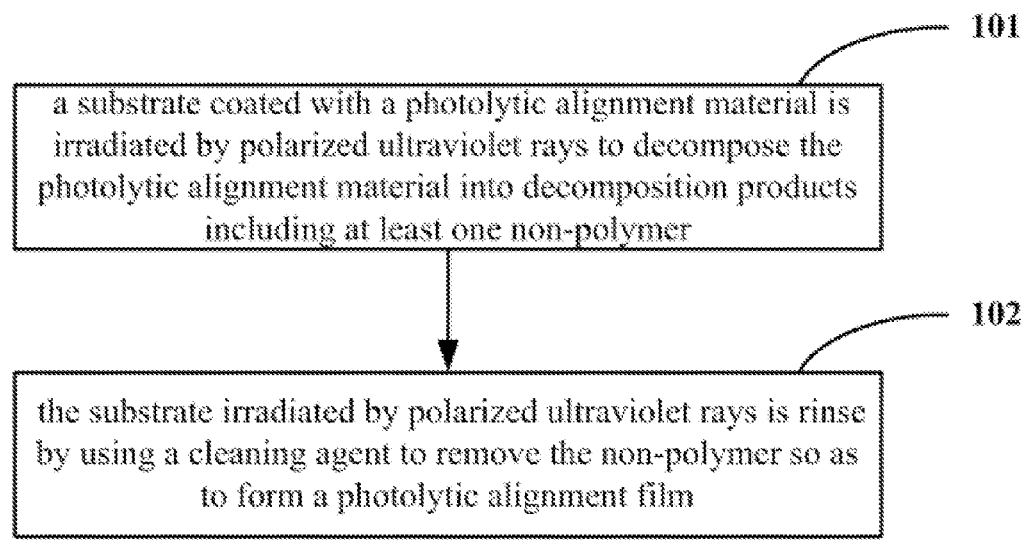
FIG. 1 is a simplified schematic flow chart of a method for fabricating an photolytic alignment film according to an embodiment of the present invention.

The present invention direct to display systems and methods thereof. Embodiments of the present invention relate to the field of optical alignment and particularly to a method for fabricating a photolytic alignment film, a liquid crystal display panel and a display device.

As mentioned above, conventional display systems are often inadequate. Among flat panel display devices, Thin Film Transistor Liquid Crystal Displays (TFT-LCDs) have dominated the current market of flat panel displays due to their low volume, low power consumption, low fabrication cost, no radiation and other characteristics. An alignment film of a liquid crystal display is one of important factors influencing the display quality of the liquid crystal display, and the liquid crystal alignment film has become increasingly important along with the increasingly high quality of the liquid crystal display.

The liquid crystal alignment film is fabricated by using alignment material generally in two methods: a rubbing method and an optical alignment method. For example, a fluey fabric comes into contact with alignment material and rubs against the alignment material in the same direction in the rubbing method, whereas the alignment material is irradiated by the line polarized ultraviolet without any contact therewith in the latter, so dust or static generated in the optical alignment method may be less than that in the rubbing method. Liquid crystal alignment film with a good alignment property can be fabricated in the optical alignment method to improve the performance of display elements of liquid crystal. Optical alignment materials used in optical alignment methods can be divided into different types of optical alignment materials, which include an optically isomeric alignment material, an optically cross linked alignment material, and a photolytic alignment material based on different alignment principles used in the optical alignment methods, wherein the optically isomeric alignment material suffers from both the problem of coloring and poor thermal stability. Optically cross linked alignment material often suffers from a randomly occurring polymeric reaction of optically active radicals in optically cross linked molecules during a polymeric reaction, therefore a polymeric grid structure with a function of alignment may be generated and a secondary reaction may occur, thus resulting in unnecessary generation of polymeric molecule which may give rise to a residual image; and the photolytic alignment material which is polymeric material may be decomposed into decomposition products including a primary product and a secondary product upon being irradiated by light, wherein the primary product is a polymer from which an alignment layer is formed, and the secondary product is a non-polymer including small molecules which may result in the problem of a residual image when the number of the small molecules that remain is significant.

The present invention are described in details with reference to the drawings. Apparently the described embodiments are only a part the embodiments of the present invention, but not all of the embodiments of the present invention. There can be other embodiments as well.

Based upon the embodiments of the present invention, all of other embodiments derived by those ordinarily skilled in the art without any inventive effort shall come into the scope of the present invention.

To fabricate a photolytic alignment film, alignment material subjected to a coating process can be processed in the two processes. In one of the processes, the alignment material is first pre-baked to remove a solvent in the alignment material, then irradiated by polarized ultraviolet rays to be decomposed into decomposition products, and further post-baked to remove the non-polymer among the decomposition products to form the alignment film. In the other process, the alignment material is firstly pre-baked, then irradiated by polarized ultraviolet rays to be decomposed into decomposition products, and further subjected to second light irradiation to remove the non-polymer among the decomposition products. Two substrates with the fabricated alignment film can be cell-assembled into liquid crystal cells. Residues of the decomposed photolytic alignment film may be removed through post-baking or second light irradiation in the two processes described above. For example, irradiation processes can be infrared irradiation, far-infrared irradiation, electron-line irradiation, radioactive irradiation, or others. Irradiation process can often result in a high cost because of a high demand of light source for optical alignment.

As illustrated in FIG. 1, an embodiment of the present invention firstly provides a method for fabricating a photolytic alignment film, which includes:

Step 101 (i.e. step a): a substrate coated with a photolytic alignment material is irradiated by polarized ultraviolet rays to decompose the photolytic alignment material into decomposition products including at least one non-polymer; and Step 102 (i.e., step b): the substrate irradiated by polarized ultraviolet rays is rinse by using a cleaning agent to remove the non-polymer so as to form a photolytic alignment film.

It is to be appreciated various steps illustrated in FIG. 1 may be added, removed, repeated, modified, replaced, rearranged, and/or overlapped. In various implementations, the non-polymer among the decomposition products of the photolytic alignment material is removed by using the cleaning agent. The photolytic alignment film can be fabricated at a greatly lowered cost due to the cheap cleaning agent. The non-polymer among the decomposition products can be cleared by using the cleaning agent that is applied by using a spray device or a rinsing pool without light source of second light irradiation typically used in the prior art to thereby greatly lower the device cost. In an embodiment of the present invention, the photolytic alignment material is a polymeric material. After the photolytic alignment material is irradiated by polarized ultraviolet rays, side chains or a part of main chains of the photolytic alignment material are broken dependent upon the different types of the photolytic alignment material so that the photolytic alignment material is decomposed into a polymer from which the alignment film is formed. At least one non-polymer includes small molecules, which may give rise to a residual image if they remain on the substrate. It is to be appreciated that one of the benefits according to embodiments of the present invention is to remove the non-polymer by using the cleaning agent.

In the step 102 (the step b), the substrate irradiated by polarized ultraviolet rays can be rinsed by using the cleaning agent in a number of ways. For example, the substrate irradiated by polarized ultraviolet rays can be soaked in a cleaning pool filled with the cleaning agent or the cleaning agent can be sprayed onto the substrate irradiated by polarized ultraviolet rays, and preferably in the step 102, the substrate irradiated by polarized ultraviolet rays is rinsed by using the cleaning agent specifically by using the cleaning agent to rinse the substrate irradiated by polarized ultraviolet rays through linear spraying the substrate.

By rinsing through linear spraying, the cleaning agent can also flow out of the substrate in the direction of linear spraying while dissolving the non-polymer among the decomposition products to thereby improve the efficiency of rinsing. The temperature, spraying pressure, flow velocity, flow rate, etc., of the cleaning agent can be adjusted and controlled dependent upon the amount of the non-polymer among the decomposition products to be cleared, and the present invention will not be limited in this regard.

Preferably the direction of linear spraying is substantially the same as the alignment direction of the photolytic alignment film.

When the direction of linear spraying of the cleaning agent is the same as the alignment direction of the photolytic alignment film on the substrate, the sprayed cleaning agent will flow in the alignment direction to thereby facilitate the cleaning of the non-polymer among the decomposition products of the decomposed photolytic alignment film and further reduce the amount of the non-polymer remaining on the substrate.

Preferably, the substrate irradiated by polarized ultraviolet rays is specifically rinsed through linear spraying by using the clearing agent particularly as follows:

The substrate irradiated by polarized ultraviolet rays is rinsed through linear spraying by using the clearing agent, wherein the substrate is in a transport status with the transport direction of the substrate being opposite to the direction of linear spraying of the clearing agent.

In order to be compatible with pipelined production processes, the substrate irradiated by polarized ultraviolet rays can be rinsed through linear spraying by placing the substrate on a transport belt of a pipeline so that the substrate is in a transport status. When the transport direction of the substrate is opposite to the direction of linear spraying of the clearing agent, the substrate is equivalently rinsed through reversed linear spraying while being transported so that the non-polymer among the decomposition products can be removed more powerfully to thereby improve the efficiency of rinsing.

Moreover, in the step b, the substrate irradiated by polarized ultraviolet rays can be rinsed by using the clearing agent, particularly by rinsing the substrate irradiated by polarized ultraviolet rays by using the clearing agent at a temperature condition of 15 to 80° C., e.g., at a temperature condition of 15° C., 20° C., 20 to 25° C., 30° C., 40° C., 40 to 45° C., 60° C., 70° C. or 80° C.

The substrate irradiated by polarized ultraviolet rays is rinsed by using the clearing agent typically in a corresponding temperature condition, because an enhanced solvency of the cleaning agent at too high temperature may desolve part of the undecomposed optical alignment material, thus making the alignment film incomplete, and a poor solvency of the non-polymer among the decomposition products at too low temperature may hinder the removal of the non-polymer.

Figure 2:
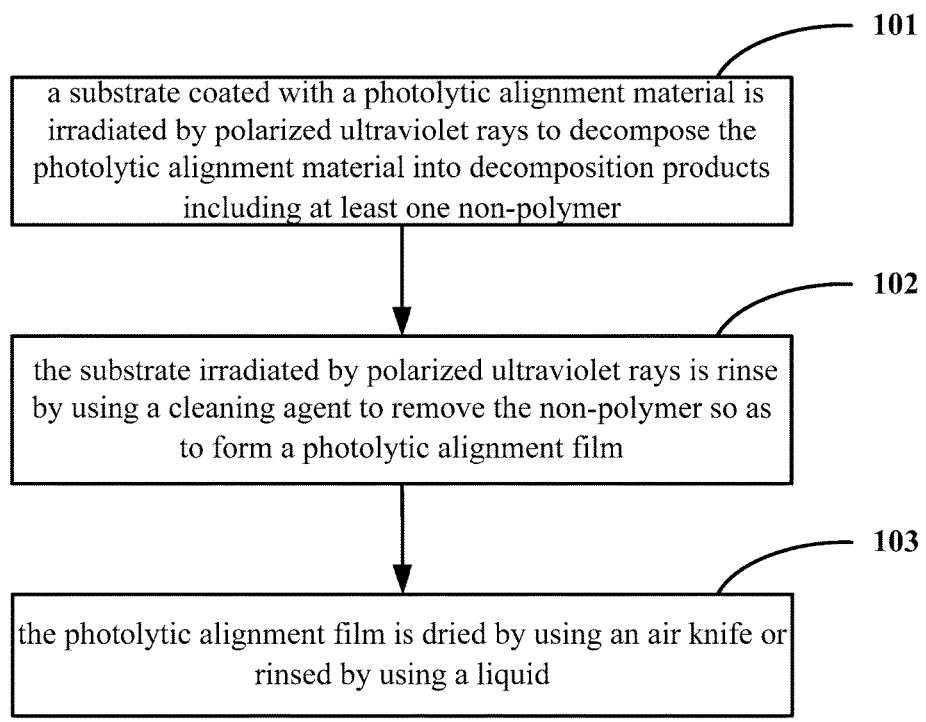
FIG. 2 is a simplified schematic flow chart of a method for fabricating an photolytic alignment film according to an embodiment of the present invention.

Optionally, as illustrated in FIG. 2, the fabricating method described above can further include the following step after the step 102 (the step b):

Step 103: The photolytic alignment film is dried by using an air knife or rinsed by using a liquid.

After the non-polymer among the decomposition products is cleaned by using the clearing agent, part of the cleaning agent may remain on the alignment film, so the photolytic alignment film can be dried by using the air knife to thereby remove the cleaning agent; or the photolytic alignment film can be rinsed by using the liquid which typically can be a solvent miscible with the cleaning agent and which is highly volatile so that the remaining part of the cleaning agent can be brought away in the liquid rinsing process. For example, the cleaning agent can be embodied as poorly volatile aniline, and the liquid can be embodied as highly volatile acetone which can be miscible with aniline.

Preferably, the drying temperature of the air knife ranges from 15 to 100° C. The drying temperature of the air knife is the temperature of an air flow ejected at a high speed from a nozzle of the air knife, for example, the drying temperature can be 15° C., 20° C., 20 to 25° C., 30° C., 40° C., 40 to 45° C., 50° C., 60° C., 70° C., 80° C., 90 to 95° C. or 100° C. The drying temperature may not be too high because the photolytic alignment film at high temperature may be problematic; and the drying temperature may not be too low, otherwise it might take a long period of time to remove the remaining part of the cleaning agent, thus degrading the efficiency of drying.

Moreover, different non-polymers can be cleared by using different cleaning agents to thereby remove the non-polymers, that is, the type of the cleaning agent can be determined based on the non-polymer among the decomposition products of the photolytic alignment film. When the non-polymer is polar molecule, the cleaning agent is a non-proton polar organic solvent; when the non-polymer is non-polar molecule, the cleaning agent is a non-polar organic solvent;

and when the non-polymer includes polar molecule and non-polar molecule, the cleaning agent is a solvent mixture of a non-proton polar organic solvent and a non-polar organic solvent.

Preferably the non-proton polar organic solvent can include one or more of toluene (at the polarity of 2.40), acetone (at the polarity of 4.30), chloroform (at the polarity of 4.40), methyl-ethyl-ketone (at the polarity of 4.50) and aniline (at the polarity of 6.30); and the non-polar organic solvent includes one or more of pentane and hexane.

Preferably the non-proton polar organic solvent can include a highly volatile polar organic solvent, e.g., acetone, dichloromethane, acetonitrile, ethyl acetate, etc.

Particularly when the non-polymer is polar molecule, the clearing agent may be the non-proton polar organic solvent at the polarity of above 4. For example, the clearing agent can include acetone (at the polarity of 4.30), chloroform (at the polarity of 4.40), methyl-ethyl-ketone (at the polarity of 4.50) or aniline (at the polarity of 6.30).

Figure 3:
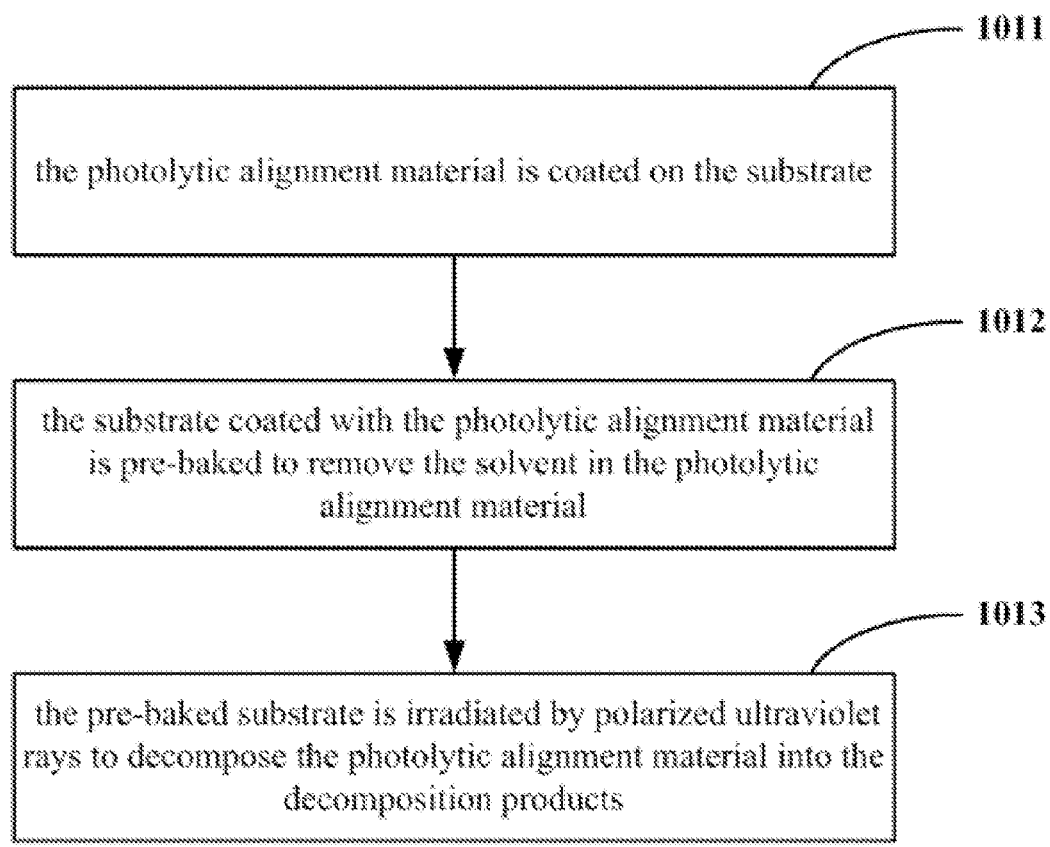
FIG. 3 is a simplified schematic flow chart of specific method steps in the step 101 illustrated in FIG. 1 or FIG. 2.

Preferably as illustrated in FIG. 3, the step 101 (the step a) can further particularly include the following steps:

Step 1011: the photolytic alignment material is coated on the substrate.

Step 1012: the substrate coated with the photolytic alignment material is pre-baked to remove the solvent in the photolytic alignment material.

Step 1013: the pre-baked substrate is irradiated by polarized ultraviolet rays to decompose the photolytic alignment material into the decomposition products.

Before the substrate is irradiated by polarized ultraviolet rays, firstly the substrate coated with the photolytic alignment material can be pre-baked to remove the solvent in the photolytic alignment material to thereby facilitate subsequent decomposition of the photolytic alignment material.

Furthermore, after the substrate coated with the photolytic alignment material is pre-baked (the step 1012) and before the pre-baked substrate is irradiated by polarized ultraviolet rays (the step 1013), the method can further include post-baking the pre-baked substrate to further remove the solvent in the photolytic alignment material.

After the substrate coated with the photolytic alignment material is pre-baked, the substrate can be post-baked to remove nearly all the solvent in the photolytic alignment material so that subsequently the photolytic alignment material will be decomposed more sufficiently leaving a less amount of residuals.

An embodiment of the present invention further provides a photolytic alignment film fabricated by using the method for fabricating a photolytic alignment film described above.

It is to be appreciated that embodiments of the present invention provide many advantages for fabricating a photolytic alignment film, and these advantages are described below by describing several polyimide photolytic alignment films as examples. The present invention will is not limited to the embodiments described below.

According to an embodiment, the present invention provides a cyclobutane di-anhydride polyimide photolytic alignment material is coated on a substrate; and particularly the cyclobutane di-anhydride polyimide photolytic alignment material can be coated on the substrate through spin-coating.

Optionally, the substrate coated with the cyclobutane di-anhydride polyimide photolytic alignment material is pre-baked to remove a solvent in the photolytic alignment material.

The pre-baked substrate is irradiated by polarized ultraviolet rays to decompose the cyclobutane di-anhydride polyimide photolytic alignment material into decomposition products, and in this step, a part of main chains of the cyclobutane di-anhydride polyimide is broken under the ultraviolet irradiation so that the cyclobutane di-anhydride polyimide is decomposed into bismaleimide in the following chemical reaction:

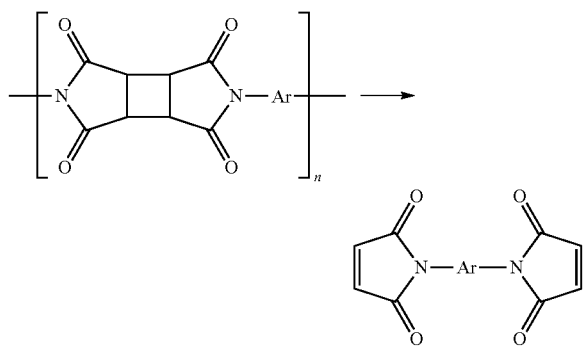

In the chemical reaction above, Ar represents aryl, and bismaleimide which is polar molecule is a non-polymer, so a cleaning agent can be embodied as a non-proton polar organic solvent;

The substrate irradiated by polarized ultraviolet rays can be rinsed by using acetone (at the polarity of 4.30) as the cleaning agent at a temperature condition of 20 to 25° C. to remove bismaleimide among the decomposition products; and particularly the substrate can be soaked in acetone or acetone can be sprayed onto the substrate.

Optionally, the rinsed substrate is dried by using an air knife at a drying temperate of 40° C. to generate a photolytic alignment film 1. Highly volatile acetone can be removed at a lower drying temperate.

According to another embodiment, a polyimide photolytic alignment material with side chains is coated on a substrate. Particularly the polyimide photolytic alignment material with the side chains can be coated on the substrate through spin-coating.

Optionally, the substrate coated with the polyimide photolytic alignment material with the side chains is pre-baked to remove a solvent in the photolytic alignment material.

The pre-baked substrate is irradiated by polarized ultraviolet rays to decompose the polyimide photolytic alignment material with the side chains into decomposition products, and in this step, a part of side chains of polyimide is broken under the ultraviolet irradiation so that the polyimide is decomposed into a compound I in the following chemical reaction:

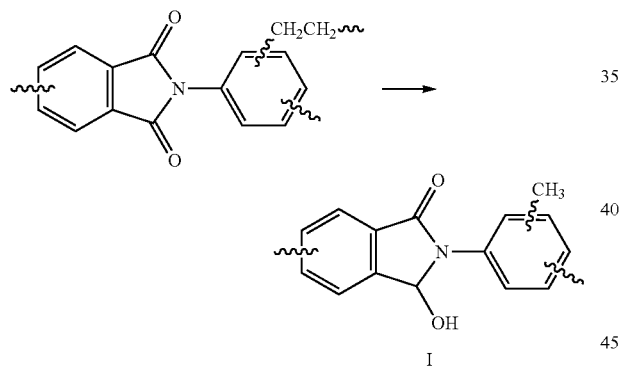

The compound I which is polar molecule is a non-polymer, so a cleaning agent can be embodied as a non-proton polar organic solvent;

The substrate irradiated by polarized ultraviolet rays can be rinsed by using a solvent mixture of aniline (at the polarity of 6.30) and toluene (at the polarity of 2.40) as the cleaning agent at a temperature condition of 20 to 25° C. to remove the compound I among the decomposition products, wherein the volume ratio of aniline and toluene among the solvent mixture is 60:40; and particularly, the substrate can be soaked in the solvent mixture or the solvent mixture can be sprayed onto the substrate.

Optionally the rinsed substrate is dried by using an air knife at a drying temperate of 70° C. to generate a photolytic alignment film 2.

In another embodiment, a ketone anhydride polyimide photolytic alignment material is coated on a substrate; and particularly the ketone anhydride polyimide photolytic alignment material can be coated on the substrate through spin-coating.

Optionally the substrate coated with the ketone anhydride polyimide photolytic alignment material is pre-baked to remove a solvent in the photolytic alignment material;

The pre-baked substrate is irradiated by polarized ultraviolet rays to decompose the ketone anhydride polyimide photolytic alignment material into decomposition products, and in this step, a part of main chains of polyimide is broken so that a part of main chains of ketone anhydride polyimide are broken under the ultraviolet irradiation and the ketone anhydride polyimide is decomposed into a compound II, and two molecules of the compound II are additively reacted into a compound III in the following chemical reaction:

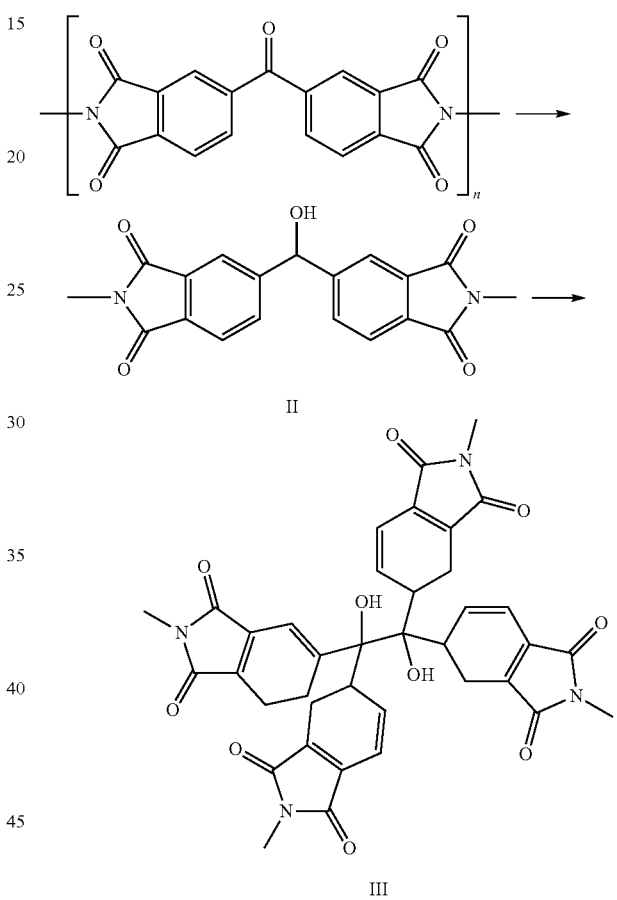

The compound III which is non-polar molecule is a non-polymer, so a cleaning agent can be embodied as a non-polar organic solvent;

The substrate irradiated by polarized ultraviolet rays can be rinsed by using hexane as the cleaning agent at a temperature condition of 30° C. to remove the compound III; and particularly, the substrate can be soaked in hexane or hexane can be sprayed onto the substrate.

Optionally, the rinsed substrate is dried by using an air knife at a drying temperate of 50° C. to generate a photolytic alignment film 3.

The photolytic alignment films 1 to 3 generated in the first to third embodiments were observed for a defect under a microscope in a conventional detection method of an oriented layer, and the observation showed that the alignment films fabricated by the method for fabricating a photolytic alignment film in the present invention are free of mura and have a good property of alignment and a high yield.

Figure 4:
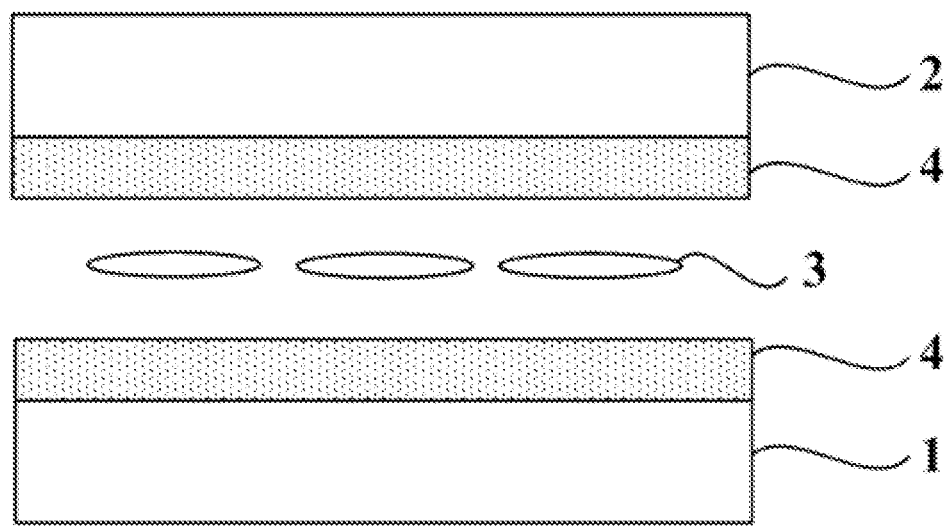
FIG. 4 is a simplified schematic structural diagram of a liquid crystal display panel according to an embodiment of the present invention.

An embodiment of the present invention further provides a liquid crystal display panel, and as illustrated in FIG. 4, there is shown a schematic structural diagram of a liquid crystal display panel according to an embodiment of the present invention, and the liquid crystal display panel includes a first substrate 1, a second substrate 2 and a liquid crystal layer 3 located between the first substrate 1 and the second substrate 2, wherein an alignment film 4 fabricated by using the method for fabricating a photolytic alignment film described above is provided on the side surface of the first substrate 1 and/or the second substrate 2 facing the liquid crystal layer 3. It shall be noted that the number of alignment films 4 in the liquid crystal display panel will not be limited thereto in this embodiment, for example, the number of alignment films 4 can be the only one located only on the first substrate 1 (not illustrated in FIG. 4); or the number of alignment films 4 can be the only one located only on the first substrate 1 (not illustrated in FIG. 4); or the number of alignment films 4 can be two and the two alignment films 4 are located respectively on the first substrate 1 and the second substrate 2 as illustrated in FIG. 4.

The liquid crystal display panel can be manufactured at a low cost due to a low fabrication cost of the method for fabricating a photolytic alignment film described above for no second light irradiation or the like is required.

Figure 5:
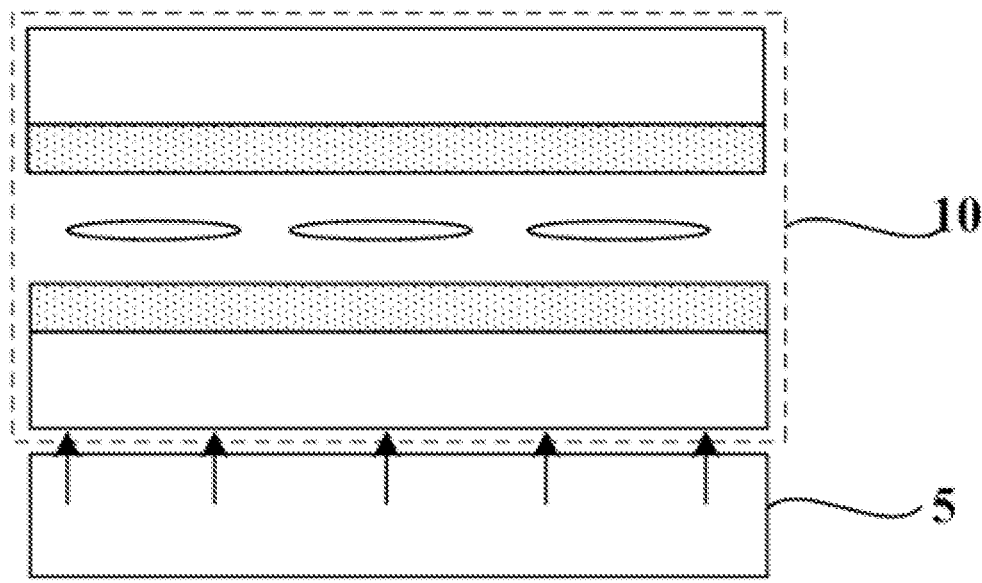
FIG. 5 is a schematic structural diagram of a display device according to an embodiment of the present invention.

An embodiment of the present invention further provides a display device, and as illustrated in FIG. 5, there is shown a schematic structural diagram of a display device according to an embodiment of the present invention, wherein the display device includes a backlight module 5 and the liquid crystal display panel 10 described above, wherein the liquid crystal display panel 10 is located on a light-emitting side of the backlight module 5.

The display device particularly can be a liquid crystal TV set, a liquid crystal display, a digital photo frame, a handset, a tablet computer, an electronic paper or any product or component with a display function.

The display device can be manufactured at a low cost due to a low cost of the liquid crystal display panel described above.

Although the preferred embodiments of the present invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the present invention.

Evidently, those skilled in the art can make various modifications and variations to the present invention without departing from the spirit and scope of the present invention. Thus the present invention is also intended to encompass these modifications and variations thereto so long as the modifications and variations come into the scope of the claims appended to the present invention and their equivalents.

What is claimed is:

1. A method for fabricating a photolytic alignment film, comprising:
   irradiating a substrate coated with a photolytic alignment material by polarized ultraviolet rays to decompose the photolytic alignment material into decomposition products, the decomposition products including at least one non-polymer; and
   rinsing the substrate irradiated by polarized ultraviolet rays by using a cleaning agent to remove the non-polymer so as to form a photolytic alignment film;
   wherein when the non-polymer is polar molecule, the cleaning agent is a non-proton polar organic solvent;
   when the non-polymer is non-polar molecule, the cleaning agent is a non-polar organic solvent; and
   when the non-polymer includes polar molecule and non-polar molecule, the cleaning agent is a solvent mixture of a non-proton polar organic solvent and a non-polar organic solvent.

2. The method according to claim 1, wherein the rinsing the rinsing the substrate irradiated by polarized ultraviolet rays by using a cleaning agent comprises:
   rinsing the substrate irradiated by polarized ultraviolet rays by using a cleaning agent linear spraying the substrate.

3. The method according to claim 2, wherein a direction of linear spraying is the same as an alignment direction of the photolytic alignment film on the substrate.

4. The method according to claim 2, wherein the rinsing the substrate irradiated by polarized ultraviolet rays by using a cleaning agent linear spraying the substrate comprises:
   rinsing the substrate irradiated by polarized ultraviolet rays by using a cleaning agent linear spraying the substrate with the substrate being in a transport status and with a transport direction of the substrate being opposite to a direction of linear spraying of the clearing agent.

5. The method according to claim 1 further comprises:
   drying the photolytic alignment film by using an air knife or rinsing the photolytic alignment by film using a liquid.

6. The method according to claim 5, wherein a drying temperature of the air knife ranges from 15 to 100° C.

7. The method according to claim 1, wherein when the non-polymer is polar molecule, the clearing agent is the non-proton polar organic solvent at the polarity of above 4.

8. The method according to claim 1, wherein the non-proton polar organic solvent includes a highly volatile polar organic solvent.

9. The method according to claim 1, wherein the non-proton polar organic solvent includes one or more of toluene, acetone, chloroform, methyl-ethyl-ketone and aniline; and the non-polar organic solvent includes one or more of pentane and hexane.

10. The method according to claim 1, wherein the irradiating the substrate comprises:
    coating the photolytic alignment material on the substrate;
    pre-baking the substrate coated with the photolytic alignment material to remove the solvent in the photolytic alignment material; and
    irradiating the pre-baked substrate by polarized ultraviolet rays to decompose the photolytic alignment material into the decomposition products.

11. The method according to claim 10, wherein after the pre-baking the substrate coated with the photolytic alignment material, the method further comprises:
    post-baking the pre-baked substrate to remove the solvent in the photolytic alignment material.

12. The method according to claim 1, wherein rinsing the substrate irradiated by polarized ultraviolet rays by using a cleaning agent comprises: rinsing the substrate irradiated by polarized ultraviolet rays by using the cleaning agent at a temperature condition of 15 to 80° C.

13. A liquid crystal display panel, comprising a first substrate, a second substrate and a liquid crystal layer located between the first substrate and the second substrate, wherein an alignment film fabricated by using the method for fabricating a photolytic alignment film according to claim 1 is provided on the side surface of the first substrate and/or the second substrate facing the liquid crystal layer.

14. A display device, comprising a backlight module and the liquid crystal display panel according to claim 13, wherein the liquid crystal display panel is located on a light-emitting side of the backlight module.

\* \* \* \* \*